March 13, 1934.   C. J. BOCK   1,950,592
OUTER WHEEL BEARING RETENTION
Filed March 10, 1932

Inventor
Carl J. Bock
By Blackmore, Spencer & Flint
Attorneys

Patented Mar. 13, 1934

1,950,592

UNITED STATES PATENT OFFICE 1,950,592

OUTER WHEEL BEARING RETENTION

Carl J. Bock, Pontiac, Mich., assignor to Yellow Truck & Coach Manufacturing Company, Pontiac, Mich., a corporation of Maine Application March 10, 1932, Serial No. 597,927

7 Claims. (Cl. 308—211)

This invention relates to motor vehicles and particularly to an improved wheel bearing assembly.

With the rapid increase in bearing sizes, which has come about through increased loads and demands for long life, considerable difficulty has been experienced in trying to crowd all the necessary parts within the relatively small space afforded by the wheel bores. As a solution of the problem it is proposed to insert the conventional outer bearing in the wheel hub opening from the inside of the hub and retain it in place by means of a snap ring inserted after the bearing and removably seated within an annular groove in the interior of the hub, to provide an abutment or shoulder for holding the bearing against axial displacement. Besides affording a convenient method of assembling, the invention provides a compact and simplified design of reduced cost and a substantial and fool-proof arrangement of parts.

Figure 1:
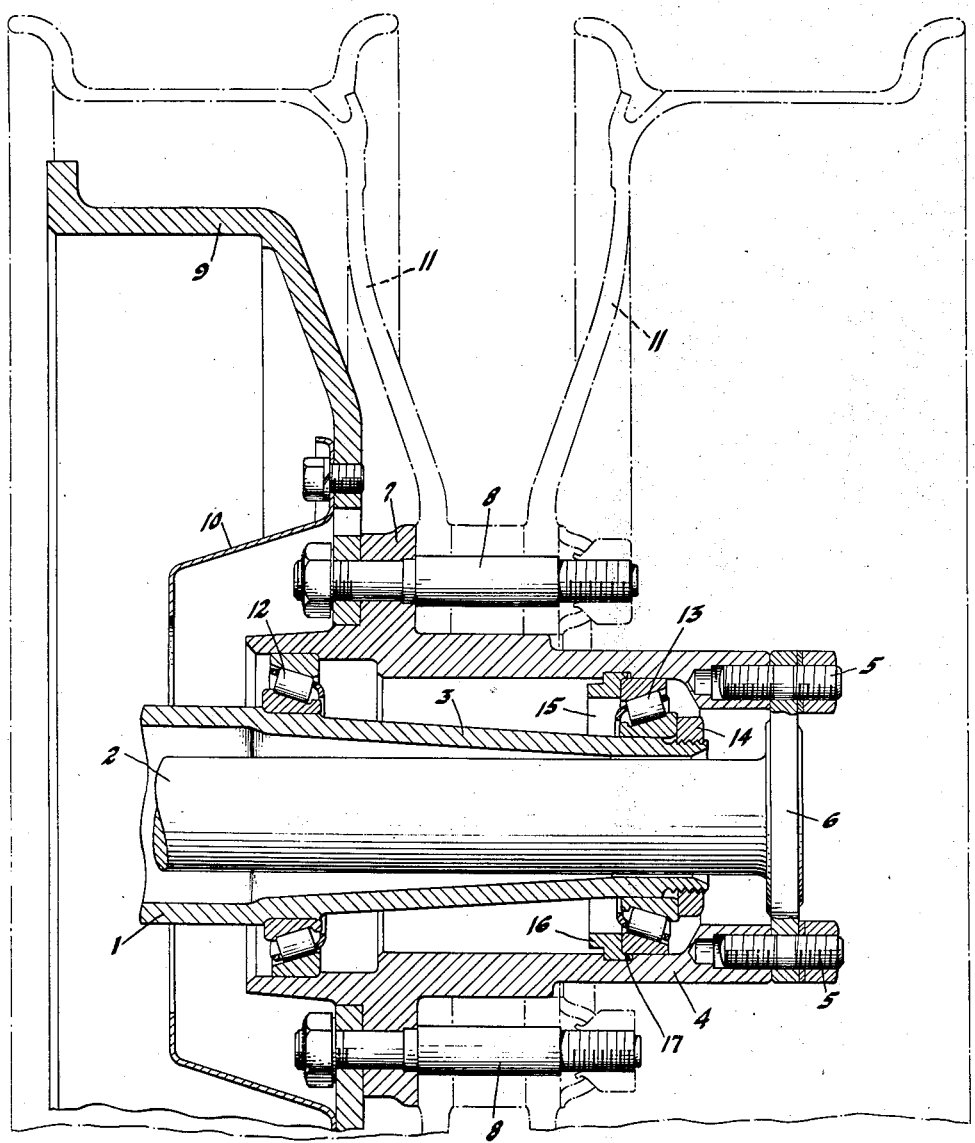
Figure 2:
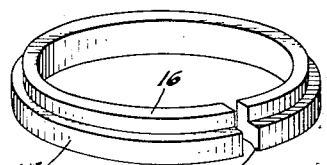

To enable a better understanding of the nature of the invention, the following detail specification will refer to the accompanying drawing illustrating a preferred, but not necessarily the only embodiment, and consisting of a transverse sectional view of the wheel assembly labeled Figure 1, and a detail perspective view of the retainer ring labeled Figure 2.

In the drawing the reference numeral 1 indicates an axle housing enclosing a live or driving axle 2 and having a reduced end portion that forms a trunnion or mounting spindle 3 received within the hollow wheel hub 4, which at the outer end is fastened by bolts or studs 5 to an enlarged driving head 6 of the axle shaft 2. To an annular peripheral flange 7 on the hub 4, a series of long bolts 8 secure on one side a brake drum 9 carrying a grease deflector or shield 10 and on the other side, a pair of demountable road wheels 11, all in accordance with the usual practice.

In the present instance, the bore or opening through the hub 4 is of stepped formation and of smaller cross sectional dimension at its outer end than at the inner end. Within the opening and between the stationary trunnion 3 and the rotatable hub 4 are mounted roller bearing assemblies 12 and 13, respectively, in axially spaced relation adjacent opposite ends of the hub. Both bearings have an outside diameter greater than the size of the bore at the outer end of the hub where the connection is made with the driving shaft, and are assembled from the inside prior to the time the wheel is mounted on its trunnion. As shown in the drawing, the inner race of the outermost bearing 13 is held by a nut 14 threaded on the end of the trunnion 3 and the outer race abuts on its inner side with a shoulder provided by a split spring or snap ring 15 removably seated within an annular groove on the interior of the hub. In the case of the innermost bearing 12, the inner side of the inner race rests against a shoulder on the stationary trunnion and the outer side of its outer race bears against a shoulder formed as a part of the hub. With the nut 14 removed, the wheel hub with its bearings can be slid on or off the end of the axle housing.

In the assembly of the hub and bearings, the outermost bearing, snap ring and innermost bearing, are successively entered into the bore from the inside of the hub. After the introduction of the bearing 13, the snap ring 15 is moved axially outward in contracted form until it reaches and seats within its groove to thereafter position and hold the bearing against axial displacement. The reverse procedure enables separation of the parts. To facilitate the unseating of the ring 15 it is preferably provided with a reduced extension 16 spaced from the interior surface of the hub to permit the insertion in the space of a suitable prying tool by which the expanded ring can be contracted and freed from its groove.

It is to be noted that the outside face of the split ring 15 is shown in the drawing with a recess to receive the outer race of bearing 13 and to provide a projection or shoulder 17, which overlaps the peripheral surface of the race. This arrangement is intended to afford an interlock which securely holds the ring in its groove or seat and against accidental displacement. In order to contract the ring for its removal, it is first necessary to shift the bearing 13 axially in the hub and out of overlapping engagement with the projection 17, which of course, is possible only after the nut 14 has been unthreaded and the wheel removed from its spindle.

From the above description it will be apparent that there is thus provided a compact assembly of parts, affording in a simple and practical fashion, accommodation of large sized bearings. Various modifications and applications of the invention here referred to in one specific embodiment may be made without departing from the spirit and scope of the appended claims.

I claim:

1. In a motor vehicle, a stationary trunnion, a rotatable member sleeved upon the trunnion and having a bore of larger cross sectional dimension at one end than at the other, a pair of axially spaced bearings between the trunnion and rotatable member, each having an overall dimension greater than the dimension of the bore at its smaller end, and being adapted for insertion in the bore through the larger end to positions adjacent opposite ends of the member, and means associated with the rotatable member for engagement with the outermost bearing to hold the same in position.

2. In a motor vehicle, a wheel hub having an opening to receive an axle, a bearing adapted for insertion in the opening from the inner side of the hub to a position adjacent the outer side of the hub, and a split ring retainer for the bearing removably seated in an annular groove interiorly of the hub and provided with a shouldered portion for the engagement of a tool for moving the ring out of the seat.

3. In a motor vehicle, a wheel hub having an opening to receive an axle, a bearing adapted for insertion in the opening from the inner side of the hub to a position adjacent the outer side of the hub, and a split ring retainer for the bearing removably seated in an annular groove interiorly of the hub and provided with a recessed face to receive a portion of the bearing whereby to lock the ring against displacement.

4. In a motor vehicle, inner and outer relatively rotatable members, a bearing between the members, a retainer on one member for engagement with one side of the bearing, and a snap ring retainer seated within a groove in the other member for engagement with the opposite side of the bearing, said snap ring retainer and bearing having overlapping portions to hold the retainer against displacement from its groove.

5. In a motor vehicle, an axle housing, a drive axle within the housing, a rotatable wheel hub sleeved on the housing and drive connected with the shaft, a pair of axially spaced bearings between the hub and housing inwardly of the connection between the hub and shaft, the hub receiving the bearings from the inner end thereof, and locating means to hold one of the bearings near the outer end of the hub and against inward axial displacement.

6. In a motor vehicle, an axle housing, a drive shaft within the housing, a wheel hub recessed from its inner end and rotatably mounted upon the housing, a drive connection between said shaft and the outer end of the housing, a pair of axially spaced bearings between the hub and housing receivable within the hub from its inner end, and locating means receivable within the hub after one of the bearings is inserted and removably associated with the hub near its outer end to hold said bearing against inward displacement.

7. In a drive axle assembly for motor vehicles, an axle housing for a drive shaft, a wheel hub sleeved on the housing, a bearing interposed between the hub and housing, an end portion integral with the hub and extending radially inward beyond the perimeter of the bearing for connection with said shaft, and means retaining said bearing against axial movement away from said end portion, said means being carried by the hub and movable out of the path of said bearing.

C. J. BOCK.